United States Patent [19]

Tsuchiya et al.

[11] 4,131,927
[45] Dec. 26, 1978

[54] A.C. POWER SUPPLY CIRCUIT WITH SURGE CURRENT SUPPRESSION

[75] Inventors: Takuichi Tsuchiya; Shinichi Shinagawa, both of Tokyo, Japan

[73] Assignee: Nippon Electric Company, Ltd., Tokyo, Japan

[21] Appl. No.: 821,102

[22] Filed: Aug. 2, 1977

[30] Foreign Application Priority Data

Aug. 3, 1976 [JP] Japan .................................. 51-93025

[51] Int. Cl.² ............................................ H02H 9/00
[52] U.S. Cl. ......................................... 361/6; 323/9; 361/9; 361/10; 361/13
[58] Field of Search ..................................... 361/3–10, 361/13, 58; 323/9

[56] References Cited

U.S. PATENT DOCUMENTS 3,783,305  1/1974  Lefferts ................................ 361/8 X
3,921,038  11/1975  Kernick et al. ...................... 361/7 X
4,001,643  1/1977  Ramberg et al. ........................ 361/8

*Primary Examiner*—Harry E. Moose, Jr.
*Attorney, Agent, or Firm*—Sughrue, Rothwell, Mion, Zinn and Macpeak

[57] ABSTRACT

The current surge, normally associated with the initial application of a nominal A.C. current to an inductive load, is prevented by preventing the magnetic core of the inductive load from being driven into saturation. Initially, the current is half wave rectified and amplitude limited. The amplitude limitation insures that the core will not be driven into saturation. A voltage detector connected across the inductive load senses only the counter E.M.F. of a polarity opposite to the polarity of the half wave current. When the sensed voltage reaches a predetermined value, a direct connection is provided between the A.C. supply and the inductive load, bypassing the half wave rectifier and the amplitude limiter.

6 Claims, 3 Drawing Figures

A.C. POWER SUPPLY CIRCUIT WITH SURGE CURRENT SUPPRESSION

BACKGROUND OF THE INVENTION

The present invention relates to an A.C. Power Supply Circuit having means for preventing a surge of current caused immediately after turning on a power supply, having an inductive load including a magnetic core device, such as a high-voltage transformer.

A power supply used for a high power radio comminication transmitter is normally controlled so that it may be switched on after a receiver and the like have been turned on. The power supply control for the transmitter is achieved by controlling the input of the power supply transformer. Since the power supply transformer is inductive, an excessive current surge is caused when turned on. Recently developed completely transistorized transmitters can suffer component damage by the current surge.

A conventional A.C. Power Supply Circuit, which is adapted to prevent the current surge, has a switching circuit having a so-called "soft-start means" which prevents the current surge by successively raising the voltage applied to the load. The switching circuit provides control over resistors or reactors inserted in series with the load by successively short-circuiting them. Alternatively, if a thyristor is employed, its conducting phase angle is successively increased. As an example of the latter method, reference is made to an article by K. Kishi at al entitled "Thyristorized Constant-Voltage D-C Power Supply for High-Power Transmitter" published in "Toshiba Review (Vol. 25, no. 12, p.p. 1545–1550). As an example of the former method, reference is made to the instruction manual for Power Supply Model 1029, 1031, and 1032 published by Enengy Systems, Inc., Palo Alto, Calif., U.S.A.

It is difficult, however, for these conventional power supply circuits to keep the current surge lower than 1.5 times as large as the nominal current. Usually these conventional techniques involve a large number of resistors or reactors for the successive short-circuiting or a very slow time-consuming increase in the conducting phase angle of a thyristor.

SUMMARY OF THE INVENTION

It is therefore an object of the present invention to provide a controlled A.C. Power Supply Circuit free from the disadvantages of conventional circuit structures and capable of quickly suppressing the current surge.

In general, a high-voltage transformer constituting the load for an A.C. Power Supply circuit is designed to operate at a magnetic flux density level as low as one half of the saturation level. Therefore, if a voltage as high as a nominal A.C. voltage is applied across its input terminals without regard to the sign and magnitude of the residual magnetic flux density retained within the core of the transformer, the core is easily driven to a saturation magnetization level causing the current surge, because a core magnetized to the saturation level can exhibit a very low impedance to the windings of the transformer.

The present invention is based on the unilateral restricted intial magnetization of the core and the in-phase switchover of the initial magnetization to a normal state, the switchover being controlled in response to a counter electromotive force developed across the load as a result of the initial magnetization.

According to the present invention, the load transformer is initially magnetized in one polarity in response to a positive-going half-wave current of limited amplitude supplied through an auxiliary current path, so that a voltage developed across the load in polarity opposite to the half-wave current is detected. With the detected voltage reaching a preset value, the current path is switched over to a main current path allowing a nominal current to flow into the load transformer so that the saturation magnetization of the core of the load transformer is avoided, thus preventing the current surge.

BRIEF DESCRIPTION OF THE DRAWINGS

In the accompanying drawing

DETAILED DESCRIPTION OF THE INVENTION

Figure 1:
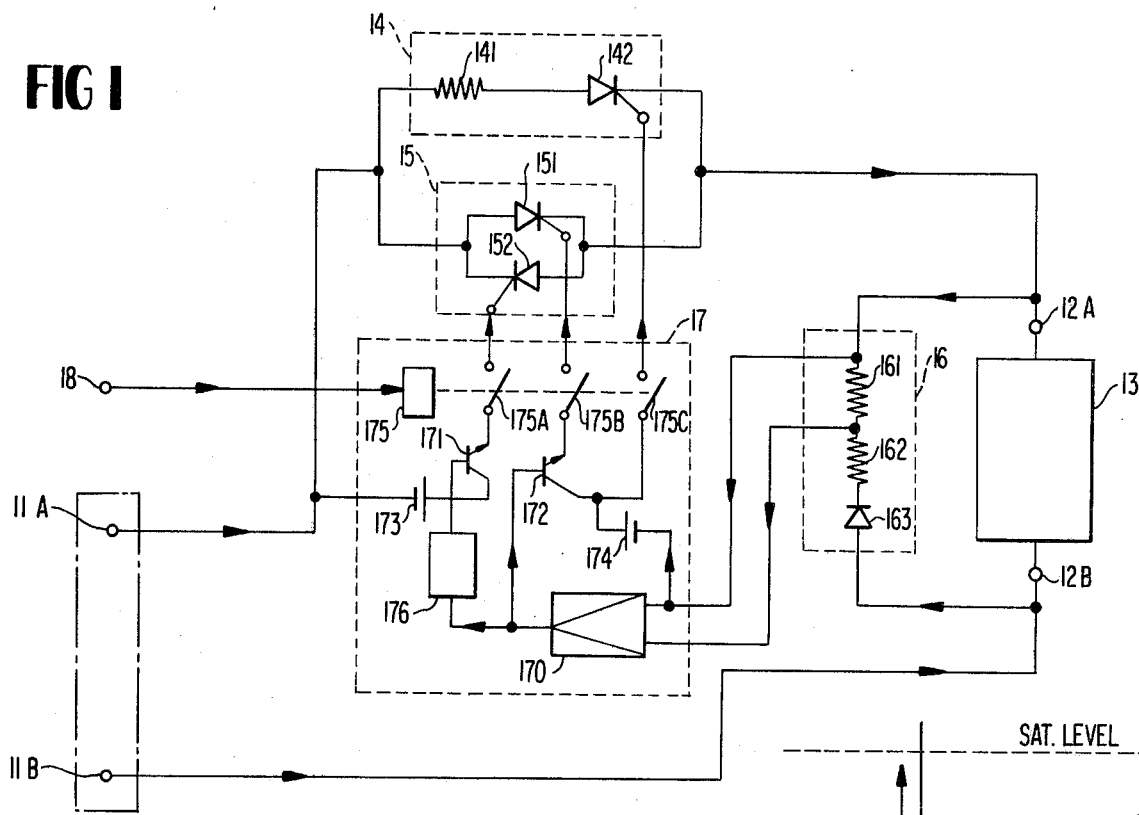
FIG. 1 is a circuit diagram of an embodiment of the present invention.

Referring to FIG. 1, the surge-current suppressing circuit of the present invention has: a pair of power supply input terminals 11A and 11B connected to an A.C. Power source not shown; a pair of output terminals 12A and 12B connected to an inductive load 13 such as a high-voltage power supply circuit including a transformer having a magnetic core, an auxiliary current path 14 having a resistor 141 and a thyristor 142 for connecting the input terminal 11A to the output terminal 12A; and a main current path 15 having a pair of thyristors 151 and 152 and connected in parallel with the auxiliary current path 14. Across the output terminals 12A and 12B is connected an induced negative-going voltage detector 16 having resistors 161 and 162 and a diode 163. The voltage developed across the resistor 161 is supplied to a current path control circuit 17 which is adapted to control the thyristors 142, 151 and 152 of the auxiliary and main current paths 14 and 15. The control circuit 17 has a differential amplifier 170 supplied with the negative-going voltage from the detector 16, a pair of switching transistors 171 and 172 having their respective base electrodes coupled via optically coupled isolator 176 and directly to the output of the differential amplifier 170. The collectors of transistors 171 and 172 are connected to anodes of the gate driving voltage sources 173 and 174, respectively, whose cathodes are in turn connected to the input terminal 11A and output terminal 12A respectively. The emitters of these transistors 171 and 172 are connected to the control electrodes of thyristors 152 and 151, respectively, through contacts 175A and 175B of an electromagnetic relay 175 which responds to an ON-OFF control signal supplied at a control signal input terminal 18. Beside these relay contacts 175A and 175B, another contact 175C is provided for connecting the anode of the source 174 to the control electrode of the thyristor 142 of the auxiliary current path 14. Thus, the voltage supplied from the sources 173 and 174 are supplied to the control electrodes of thyristors 152 and 151 of the main current path 15 in response to the output of the differential amplifier 170 and to the ON-OFF control signal applied at terminal 18. Also, the voltage supplied from the source 174 is applied to the control electrode of the thyristor in response only to the ON-OFF control signal.

To describe the operation of this embodiment, it is assumed that the A.C. Power Supply is connected to input terminals 11A and 11B.

Under the OFF state with an OFF command signal at the control signal input terminal 18, the contacts 175A, 175B and 175C remain open, none of the thyristors 142, 151 and 152 is in the ON state. Upon the application of ON command at the terminal 18, the relay 175 is energized to close the contacts 175A, 175B and 175C. At that moment, the transistors 172 and 171 are not turned ON yet, because the negative-going voltage across the resistor 161, that is due to the inductance of the load 13, has not built up to a value preset for the differential amplifier 170 to provide an output. On the other hand, the thyristor 142 is immediately turned ON in response to the closing of the contact 175C. The resistor 141 in series with the thyristor 142 has a resistance value sufficient to keep the current flowing therethrough lower than the nominal current for the load 13. Thus, it serves as a current limiter means.

The turning ON of the thyristor 142 of the auxiliary current path 14 causes a current to flow through the load 13. Due to the unilateral conducting property of the thyristor 142, the current under this state is of a half-wave rectified waveform. As a result, the magnetization at the magnetic core of the load 13 is biased in one direction and operated as an inductance, developing a negative-going voltage across its terminals, i.e., across the output terminals 12A and 12B. The negative-going voltage is detected by the diode 163 and sensed as a voltage across the resistor 161 connected in series therewith.

When the negative-going voltage reaches a value preset at the differential amplifier, a positive voltage output is provided at its output, which turns ON the transistors 172 and 173 to trigger thyristors 151 and 152 into the ON state. Thus, the main current path 15 is established virtually short-circuiting the auxiliary current path 14.

Figure 2:
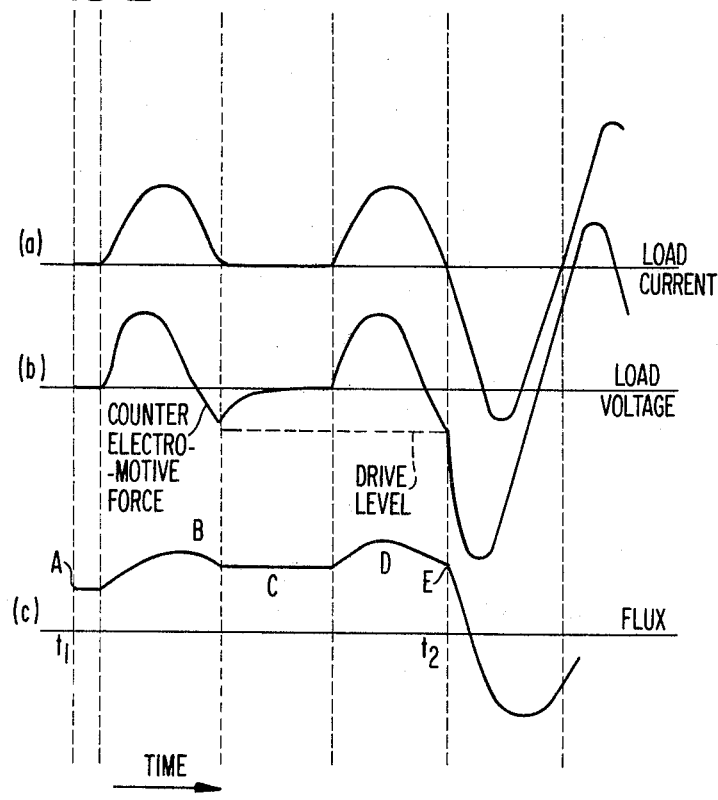
FIGS. 2a, 2b and 2c show respectively waveform diagrams for the description of the circuit of FIG. 1.
Figure 3:
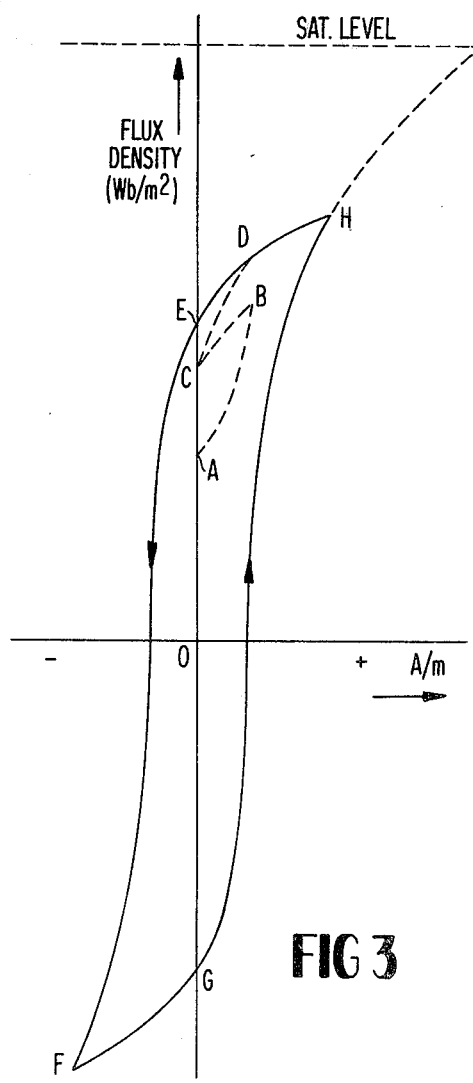
FIG. 3 shows an example of magnetic hysterisis curve for the description of the principle of the invention.

Referring now also to FIGS. 2(a), (b) and (c) showing in relative scale the waveforms for current, voltage and magnetic flux density at the load 13, respectively, the turning ON of the thyristor 142 at time $t_1$ causes a positive half cycle of the A.C. voltage to be applied to the load 13. The magnetic flux density at this moment is assumed to be at a certain level A due to the residual magnetic flux as shown in FIG. 2.(c). The magnetic flux density level A corresponds to the point A shown in the hysterisis curve of FIG. 3 for the magnetic core of the load 13. Referring to FIG. 3 showing a hysterisis loop for the normal operation with magnetic flux density and magnitude of magnetization taken along the ordinate and the abscissa, respectively, the change in the input A.C. current from zero to negative, negative to zero, and zero to positive, causes the change in the magnetization and flux density following points E→F→G→H on hysterisis loop of FIG. 3 for normal operation.

Since the positive current thus applied is limited in magnitude by the resistor 141, the magnetic flux density is raised only to the point B (FIG. 2(b) and FIG. 3 referred to). The change in the flux density causes the load 13 to exhibit a greater inductance and a negative-going counter electromotive force to be detected (FIGS. 2(b) and (c) referred to). Even at the very bottom of the negative-going voltage, it does not reach the preset value at the differential amplifier 170. On the other hand, the return to zero of load current lowers the flux density from the peak value B to a level C higher than A.

After the lapse of half cycle period, the positive-going voltage is applied again to the load 13, causing the flux density to be raised from level C to D. Due to the enhancement of the flux density level compared with the first half wave cycle, the counter electromotive force at the load 13 becomes greater in absolute values. The above-mentioned preset reference voltage for the input of the defferential amplifier 170 is set so that the negative-going voltage is equivalent to that corresponding to the flux density change from the level D to E, both of which are on the hysterisis loop for the normal operation responsive to the A.C. current supplied through the main current path. Since the flux density levels D and E are assumed to be on the hysterisis loop for the normal operation, the negative-going voltage sensed at the detector 16 turns the differential amplifier ON, turning ON the thyristors 151 and 152 at time $t_2$, switching the current path over to the main current path 15 as described above.

Since the main current path allows the full wave A.C. current to be applied to the load 13, the right-hand half of the waveforms for the load current and voltage are as shown at FIGS. 2(a) and (b). Similarly, flux density undergoes a negative-going change immediately after the switchover as shown at FIG. 2(c) and FIG. 3.

In this connection, the flux density level E need not be on the hysterisis loop for the normal operation as shown in FIG. 3. It may be lower than the latter so long as the reference voltage level for the negative-going voltage is suitably preset to achieve suppression of the current surge.

Experimental data collected by the inventors indicate that the level E may be set at a value that may make the switchover come at a time point 15 percent earlier or later than time point $t_2$ corresponding to the zero-crossing of load current.

As has been described, the present invention makes it possible to avoid the surge current by the use of the initial unilateral restricted magnetization and in-phase switch-over from the half-wave rectifying auxiliary current path to the ordinary main current path. Thus, the present invention find application in high-voltage power supply circuit for radio-wave transmitters which tend to be affected by the surge current at the time of turning ON.

What is claimed is:

1. An A.C. power supply circuit capable of surge current suppression comprising:

a pair of power input terminals for connection to an A.C. power source;

a pair of power output terminals connected to an inductive load;

an auxiliary current path connecting one of said input terminals to one of said output terminals, said auxiliary current path having a current limiting means and first controllable means responsive to a first control signal for passing only half waves of one polarity of an A.C. current supplied at said power input terminals;

means for applying a first control signal to said first controllable means;

a main current path connected in parallel with said auxiliary current path, said main current path having second controllable means responsive to a second control signal for connecting said one power input terminal to said one power output terminal and shunting said auxiliary current path;

a voltage detector means connected across said power output terminals for detecting a voltage of a second polarity opposite to said one polarity developed across said power output terminals in response to said half waves of said one polarity;

means connected to said voltage detector means for providing said second control signal when the output of said voltage detector exceeds a predetermined voltage, thereby to turn on said main current path subsequently to the turning on of the first current path in response to the first control signal.

2. An A.C. power supply circuit as claimed in claim 1 wherein said first controllable means is a first thyristor, said first thyristor being connected in series with current limiting means.

3. An A.C. power supply circuit as claimed in claim 1 wherein said second controllable means comprises second and third thyristors connected in parallel, anode-to-cathode and cathode-to-anode.

4. An A.C. power supply circuit as claimed in claim 1 wherein said voltage detector means comprises, the series of connection of an assymetrically conducting device and an impedance, said series connection being connected across said output terminals, the polarity of the connection of said assymetrically conducting device being such that said predetermined voltage can only appear across said impedance when the voltage across said output terminals is of said second polarity.

5. An A.C. power supply circuit as claimed in claim 4 wherein said first controllable means is a first thyristor, said first thyristor being connected in series with current limiting means.

6. An A.C. power supply circuit as claimed in claim 5 wherein said second controllable means comprises second and third thyristors connected in parallel, anode-to-cathode and cathode-to-anode.

* * * * *